(12) United States Patent
Kyrtsos et al.

(10) Patent No.: US 7,834,572 B2
(45) Date of Patent: Nov. 16, 2010

(54) ROBUST BLOWER MOTOR STARTUP TECHNIQUE

(75) Inventors: Christos Kyrtsos, Southfield, MI (US); Kenneth Gerard Brown, Shelby Township, MI (US); Ibrahim Mohammed Issa, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 315 days.

(21) Appl. No.: 11/870,124

(22) Filed: Oct. 10, 2007

(65) Prior Publication Data

US 2009/0096398 A1    Apr. 16, 2009

(51) Int. Cl.
*H02P 7/00* (2006.01)
*H02P 1/04* (2006.01)

(52) U.S. Cl. ........................ 318/474; 318/563
(58) Field of Classification Search ............... 318/474, 318/563
See application file for complete search history.

(56) References Cited

U.S. PATENT DOCUMENTS

| 4,347,468 | A | 8/1982 | Wilke |
|---|---|---|---|
| RE31,367 | E | 8/1983 | D'Entremont |
| 4,665,350 | A | 5/1987 | Angi et al. |
| 6,871,126 | B2 | 3/2005 | Gorman et al. |
| 6,952,088 | B2 * | 10/2005 | Woodward et al. .......... 318/430 |
| 7,038,415 | B2 | 5/2006 | Nakamura et al. |
| 2004/0105664 | A1 | 6/2004 | Ivankovic |

FOREIGN PATENT DOCUMENTS

JP         60199716        10/1985

* cited by examiner

*Primary Examiner*—Walter Benson
*Assistant Examiner*—Erick Glass
(74) *Attorney, Agent, or Firm*—Raymond L. Coppiellie; Brooks Kushman P.C.

(57) ABSTRACT

A method for starting a blower motor with a locked rotor condition, the motor having one or more speed settings, each speed setting having a reference voltage and reference current value associated therewith, the method comprising, from a motor off condition, applying the reference voltage to the motor, the reference voltage associated with a desired speed setting; measuring current flowing through the motor to define a measured current value; comparing the measured current value to the reference current value associated with the desired speed setting to determine if a locked rotor condition exists; if a locked rotor condition exists, increasing the motor speed from the desired speed setting until either the output speed is at a maximum speed or the locked rotor condition ceases to exist; and adjusting the motor output speed value to the desired speed setting.

17 Claims, 3 Drawing Sheets

ROBUST BLOWER MOTOR STARTUP TECHNIQUE

BACKGROUND OF THE INVENTION

1. Field of the Invention

The present invention relates to blower motor startup and more specifically to starting a blower motor in a motor vehicle with a locked rotor condition.

2. Background Art

Heating, ventilation and air conditioning (HVAC) systems are used in vehicles to provide comfort to passengers in the interior cabin of the vehicle by blowing air into the cabin at a designated temperature. Such HVAC systems commonly employ blower motors for receiving air, either ambient or recirculated, and blowing the air into the interior cabin of the vehicle through a series of ducts. Depending on the particular configuration of the HVAC system, a passenger may choose the temperature and/or flow rate of the air circulated by the blower motor.

As vehicles operate in a variety of environments, it is common for parts of the blower motor or the fan driven thereby to become obstructed by environmental debris such as twigs and leaves. When obstructed in such a manner, a blower motor can fail to start upon request or start may be delayed for some period of time, causing customer dissatisfaction. Sometimes when obstructed in such a manner, a passenger request for a high air flow rate from the motor can cause the motor to draw in excessively large currents, in turn damaging the motor and/or components used to drive the blower motor such as transistors. Accordingly, a need exists for a way to protect the blower motor during start-up and to also provide the passenger with a requested flow of air in a timely fashion.

SUMMARY OF THE INVENTION

According to one aspect of the invention, a method is provided for starting a blower motor with a locked rotor condition, the motor having one or more speed settings, each speed setting having a reference voltage and reference current value associated therewith. The method comprises applying the reference voltage to the motor from an off position, the reference voltage associated with a desired speed setting. The method further includes measuring current flowing through the motor to define a measured current value and comparing the measured current value to the reference current value associated with the desired speed setting to determine if a locked rotor condition exists. If a locked rotor condition exists, the method increases the motor speed from the desired speed setting until either the output speed is at a maximum speed or the locked rotor condition ceases to exist. The method then adjusts the motor output speed value to the desired speed setting.

According to another aspect of the invention, a controller is provided for controlling a blower motor, the controller comprising a computer readable storage medium having a lookup table encoded therein, the lookup table having a plurality of speed settings associated with the motor, each speed setting having an associated reference voltage and reference current value. The controller is adaptable to apply the reference voltage to the motor, the reference voltage associated with a desired speed setting. The controller is further adaptable to measure current flowing through the motor to define a measured current value. The controller is further adaptable to compare the measured current value to the reference current value associated with the desired speed setting to determine if a locked rotor condition exists. The controller is even further adaptable to, if a locked rotor condition exists, increase the motor speed from the desired speed value until either the speed setting is maximized or the locked rotor condition ceases to exist and to adjust the motor speed setting to the desired speed setting.

According to yet another aspect of the invention, a system is provided for protecting against a locked rotor condition in a blower motor. The system comprises a blower motor adaptable to produce an output speed setting as a function of a voltage value. The system further comprises a controller adaptable to produce the voltage value, the controller having a computer readable storage medium, the storage medium including a lookup table encoded therein, the lookup table having a plurality of speed settings associated with the motor. Each speed setting has an associated reference voltage value and reference current value defined in the lookup table. The controller includes an instruction for receiving a desired speed setting. The controller includes another instruction for applying the reference voltage to the motor, the reference voltage associated with the desired speed setting. The controller includes another instruction for measuring current flowing through the motor to define a measured current value. The controller includes another instruction for comparing the measured current value to the reference current value associated with the desired speed setting to determine if a locked rotor condition exists. The controller includes another instruction for, if a locked rotor condition exists, increasing the motor output speed from the desired speed value until either the speed setting is maximized or the locked rotor condition ceases to exist. The controller includes yet another instruction for adjusting the motor output speed to the desired speed setting.

These and other features will be better understood in view of the attached drawings and the following detailed description of the illustrated embodiments.

DETAILED DESCRIPTION OF EMBODIMENTS OF THE INVENTION

Figure 1:
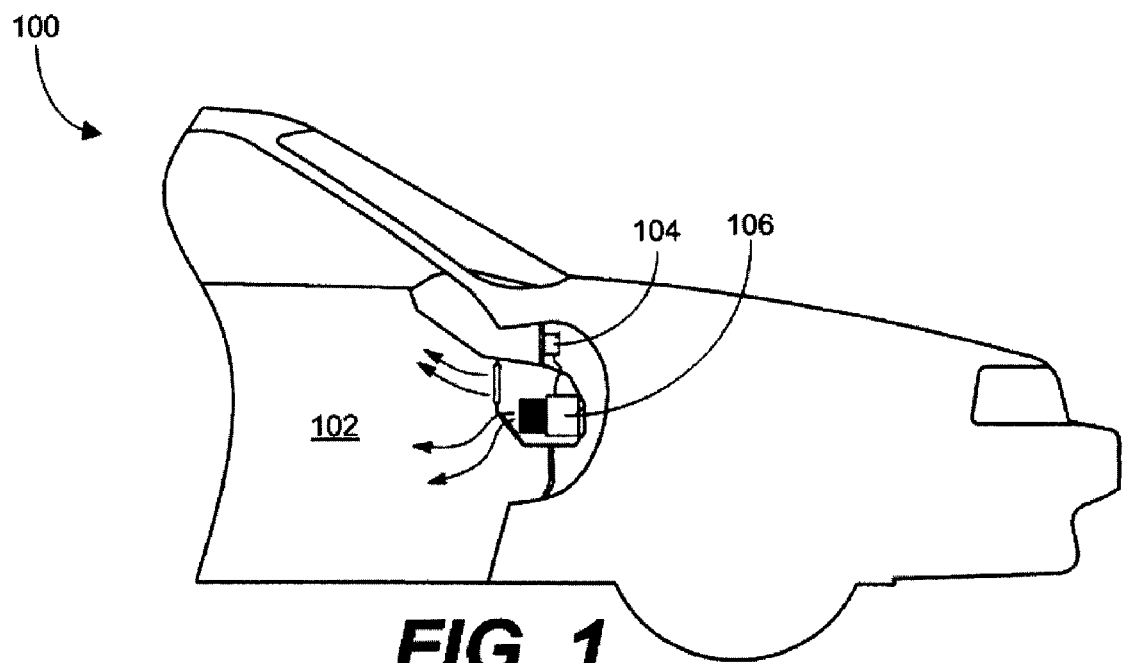
FIG. 1 shows a vehicle in which embodiments of the present invention may operate.

FIG. 1 shows a vehicle 100 in which embodiments of the present invention may operate. The vehicle may be of any type and of any suitable size and is not meant to be limiting to the scope of the present invention. The vehicle includes a blower motor 106 configured to blow air into the interior passenger cabin 102 of the vehicle 100. Although embodiments of the invention contemplate using a direct-current blower motor, any suitable motor, such as an AC motor, may be used in practice. The motor 106 may assume a number of configurations. For example, the motor 106 may have a brushed configuration, a brushless configuration or the like. A controller 104 in electrical communication with the blower motor 106 controls the operation of the motor 106. The controller and operation thereof is further discussed in the following disclosure.

Figure 2:
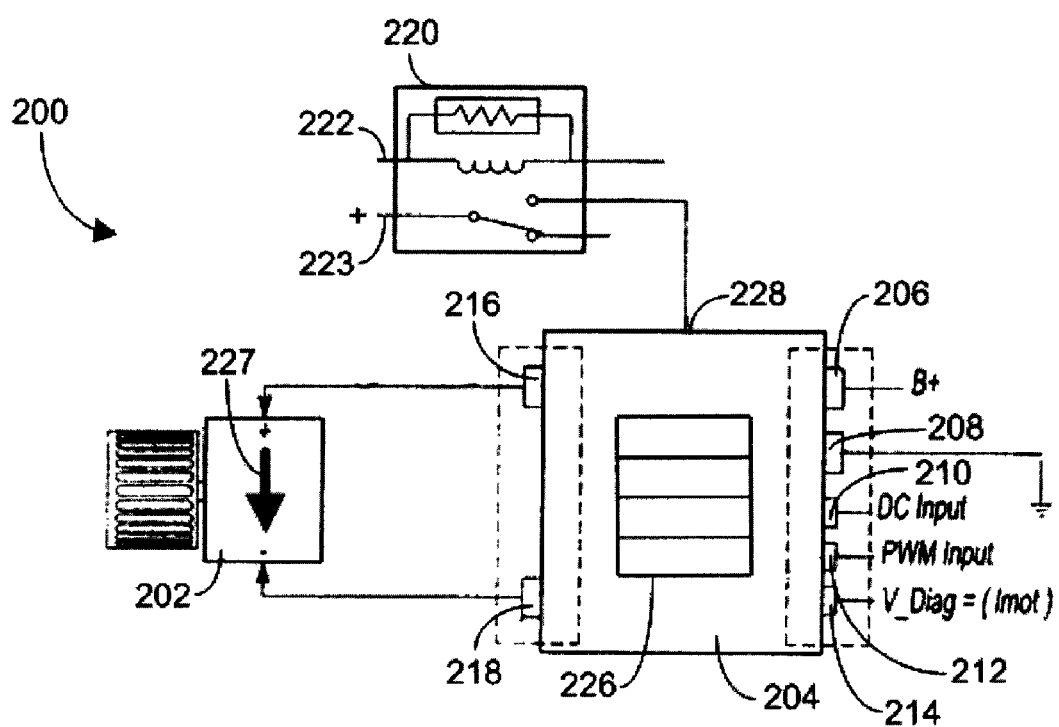
FIG. 2 shows a controller for controlling a blower motor in accordance with embodiments of the present invention.

Referring to FIG. 2, a system 200 is shown in which a controller 204 is in electrical communication with blower motor 202 via electrical ports 216 and 218, which correspondence respectively to the positive and negative inputs of blower motor 202. Note that although blower motor 202 and controller 204 are shown to share a common ground, the system 200 can be adapted to accommodate separate grounds for the controller 204 and the motor 202. The controller may be any suitable microcontroller capable of controlling motor 202. Two examples of such motors are variable blower controllers (VBCs) and linear power modules (LPMs), each of which can receive a pulse width modulated (PWM) signal to set the linear region of one or more transistors to control a motor. The controller may include a microcontroller along with any suitable storage medium for processing and storing information relating to the motor 202 and operation thereof.

As shown in FIG. 2, the controller 204 has a power input 206 labeled B+, a ground input 208, an optional DC input 210, a PWM input 212, and an optional motor current output 214. Power input 206 and ground input 208 provide the controller 204 with any suitable voltage differential to allow the controller 204 to function under normal operating conditions. The controller 204 may receive either a DC voltage, at DC input 210, or a PWM input, at terminal 212. In the former scenario, the DC voltage may be converted to a PWM signal internal to the controller 204. For example, DC input terminal 210 may accept DC inputs from a range of zero volts to ten volts. A voltage value of five volts would accordingly be converted to a PWM signal having a 50% duty cycle. The controller 204 may use these input values, either the DC input value 210 or the PWM input value 212, to step the incoming power voltage 206 down and use this new value to drive the blower motor. Assuming, for the sake of example, that motor 202 is a DC motor, a lower voltage implies lower speed whereas a higher voltage implies higher speed.

With continued reference to FIG. 2, the motor current output 214 is indicative of the current 227 flowing through motor 202. One skilled in the art will recognize that terminal 214 may output the current value in any suitable manner. For example, terminal 214 may produce a current corresponding to the current flowing through motor 202 but scaled down by a predetermined factor. Alternatively, terminal 214 could represent the current flowing through motor 202 via binary representation.

The controller 204 may have a transistor to output an appropriate voltage signal to the motor 202. The transistor may be internal to the controller 204 or may alternatively, or instead, be implemented external to the controller 204, the latter of which is shown by element 224. One skilled in the art will recognize that multiple transistors may be used in multiple configurations as dictated by the particular system.

Controller 204 includes a lookup table 226 which may include parameters associated with the speed and current of the motor 202 as well as any other parameters relevant to the motor 202 or the system 200. In one embodiment, the lookup table 226 may include various speed values within a range of speeds for the motor 202 along with driving current values corresponding to each speed. The lookup table 226 may also include environmental parameters corresponding to the motor 202, to the controller 204, or to any other relevant part of system 200. Once such example of said environmental parameters could include the temperature of the motor 202 to allow more sophisticated control over the motor 202 throughout different temperature ranges.

The controller 204 may have an enable signal terminal 228 for enabling or disenabling the controller 204. As shown, the enabling signal may be provided to terminal 228 via a relay 220 having an input signal 222 and a power signal 223. One skilled in the art will recognize that a number of suitable alternatives may be used instead of the relay and the depicted relay 220 is not meant to be limiting to the scope of the present invention. For example, an opto-isolator could be used in place of the relay to isolate signal 222 from controller 204.

For example, a vehicle may be equipped with automatic climate control. By activating the climate control, for example via a pushbutton, a vehicle operator may enable the ECU to send a control signal 222 to control input 228 of controller 204 thereby enabling the controller. In this scenario, either DC input 210 or PWM input 212 may indicate the temperature values. Such input may be received, for example, from a temperature sensor. As one skilled in the art will recognize, system 200 is by no means limited to an automatic climate control configuration. Any suitable HVAC configuration may be used in accordance with the system 200 shown in FIG. 2.

Figure 3:
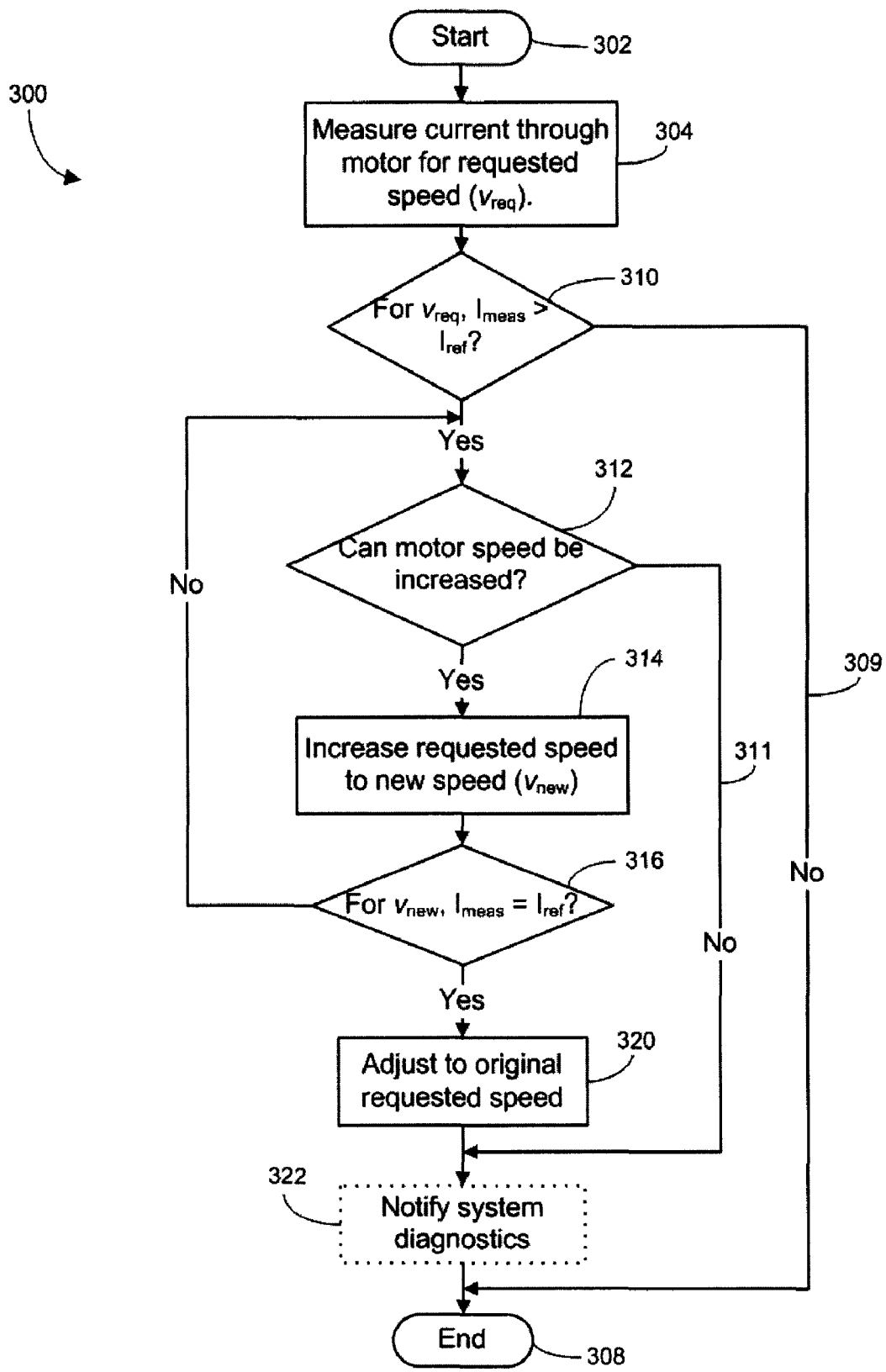
FIG. 3 shows a flowchart illustrating a method for protecting against a locked rotor condition in accordance with embodiments of the present invention.
Figure 4:
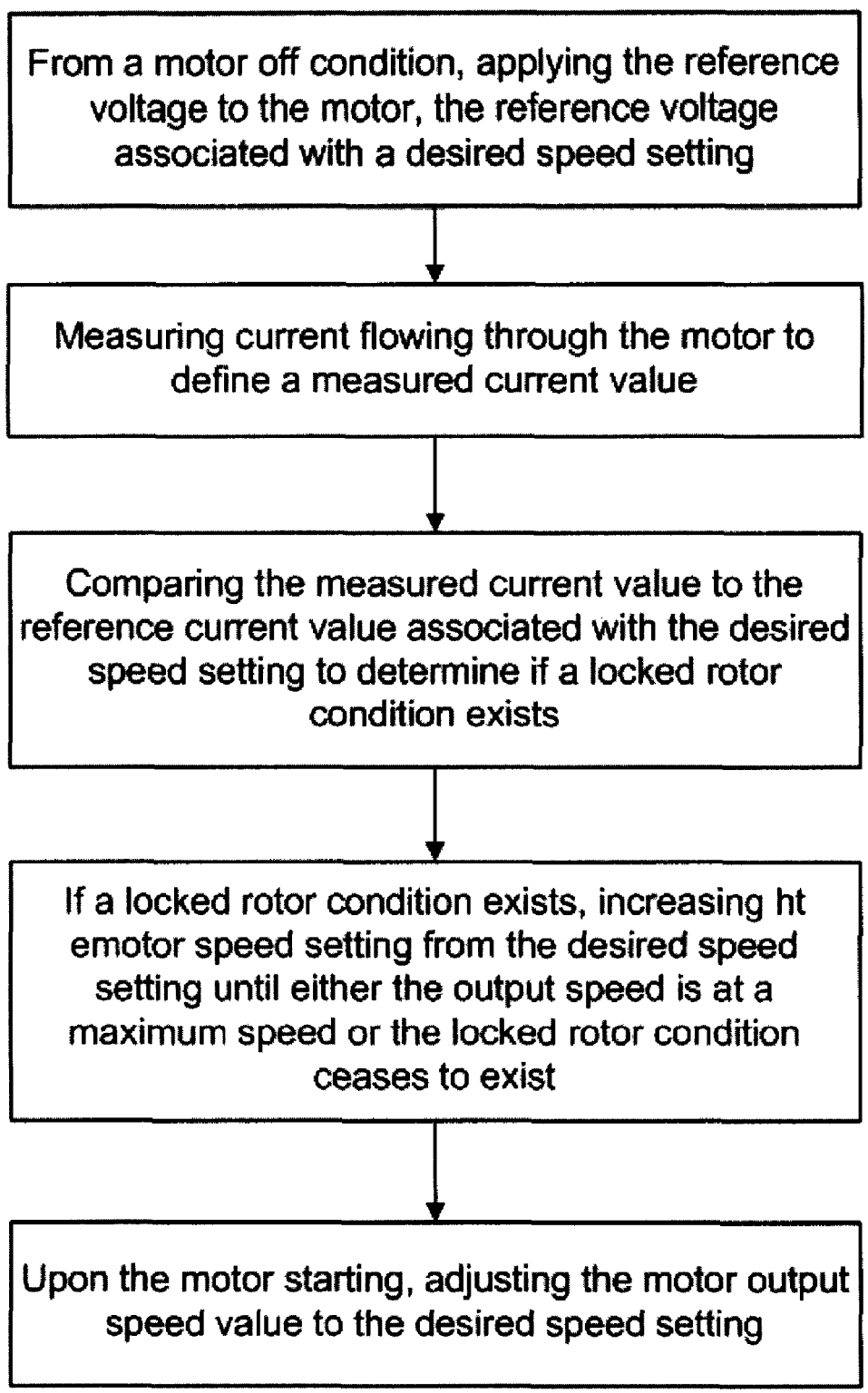
FIG. 4 shows a block diagram further illustrating a method in accordance with embodiments of the invention.

Referring now to FIG. 3, a flow chart 300 illustrates a logic diagram of the method in accordance with embodiments of the invention for protecting against a locked rotor condition in a motor, such as the direct current motor 202 shown in FIG. 2. FIG. 4 provides a written description of the basic method. The method begins when a driving voltage is applied to the motor. Next, the current going through the blower motor is measured for a requested speed, indicated by vreq. As noted earlier, the requested speed may be a motor speed requested by the operator, by an automatic climate controller, or the like. Briefly diverting to FIG. 2, current may be measured at terminal 214. However, current may be measured in any suitable manner; the current measurement technique is not meant to be limiting to the scope of the present invention. Referring back to FIG. 3, a determination is made at decision block 310 as to whether a comparison between the measured current ($I_{meas}$) and a reference current ($I_{ref}$) is greater than a threshold value ($I_{thres}$). The reference current for the requested speed may be obtained via controller lookup table 226 shown in FIG. 2.

The comparison between the measured current and the reference current may be made in any number of ways. In one variation, a comparison can be made by taking the difference between the measured current and the reference current (e.g. $I_{meas}-I_{ref}$). In another variation, a comparison can be made by dividing the two values (e.g. $I_{meas}/I_{ref}$). The predetermined error threshold, $I_{thres}$, may be defined to indicate a locked rotor state. For example, using the second of the two comparisons as previously discussed, dividing the measured value and the reference value may produce a value of 4, indicating that the measured current is four times larger than the reference current value. A predetermined error threshold may be set to 3 indicating that any value greater than three times the reference current value corresponds to a locked rotor state.

If the comparison at decision block 310 confers a locked rotor state, the method proceeds to decision block 312 via path 307 at which a determination is made whether or not the blower speed can be further increased. If the blower speed cannot be increased, the blower motor may be operating at its max speed within the speed range, in which case the method 300 concludes at element 308 via path 309. Otherwise, if the blower speed can be increased, the method proceeds via path 313 to block 314 at which the blower speed is increased. Preferably, the speed is increased accordingly with the configuration of the particular motor to optimize motor performance.

Next, at decision block 316, the current associated with the newly increased speed ($I_{new}$) is measured and compared to the reference current ($I_{ref,new}$) to determine whether $I_{new}$ is within an acceptable range of $I_{ref,new}$. Said acceptable range may be pre-determined or determined based on other factors, such as temperature, motor life span, or the like. If $I_{new}$ is within an acceptable range of $I_{ref,new}$, the method proceeds via branch 317 to element 320 in which the blower motor speed is adjusted to the original requested speed. The original requested speed may be stored in any suitable manner. For example, the requested speed may be stored, prior to or during the method of 300, to the controller shown in FIG. 2. Referring back to decision element 316, if $I_{new}$ is not within an acceptable range of $I_{ref,new}$, the method iteratively proceeds via branch 319 to decision element 312.

Following 320, prior to concluding at block 308, the method optionally proceeds to block 322 at which the controller can generate and log a diagnostic fault code. Such a code can be used in a variety of ways. The fault code can be used to generate a warning signal to notify a vehicle operator of the motor lock-up upon a specified number of occurrences, either via the controller or by first sending the fault codes to an engine control unit. The fault code can also be combined with other parameters, such as temperature values and speed values, for feedback to a vehicle dealership or similar maintenance site.

The method shown beneficially provides the ability to start a motor more effectively in a variety of environmental conditions and temperature ranges. Additionally, a motor that is normally more difficult to start due to an obstruction or water damage can be safely started via the method 300 shown in FIG. 3.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for starting a blower motor with a locked rotor condition, the motor having one or more speed settings, each speed setting having a reference voltage and reference current value associated therewith, the method comprising:
   from a motor off condition, applying the reference voltage to the motor, the reference voltage associated with a desired speed setting;
   measuring current flowing through the motor to define a measured current value;
   comparing the measured current value to the reference current value associated with the desired speed setting to determine if a locked rotor condition exists;
   if a locked rotor condition exists, increasing the motor speed setting from the desired speed setting until either the output speed is at a maximum speed or the locked rotor condition ceases to exist and generating a diagnostic fault code having information associated with the locked rotor condition; and
   upon the motor start, adjusting the motor output speed value to the desired speed setting.

2. The method of claim 1, wherein the step of generating a diagnostic fault code further comprises logging the fault code in a computer readable memory location.

3. The method of claim 1, wherein the step of comparing the measured current value to the reference current value is defined by the expression $$I_{error} = I_{measured} - I_{reference}$$

where:
$I_{error}$ is an error value,
$I_{measured}$ is the measured current value, and
$I_{reference}$ is the reference current value;
wherein the locked rotor condition exists if the error value exceeds a predetermined threshold value.

4. The method of claim 1, wherein the step of comparing the measured current value to the reference current value is defined by the expression $$I_{error} = I_{measured} / I_{reference}$$

where:
$I_{error}$ is an error current value,
$I_{measured}$ is the measured current value, and
$I_{reference}$ is the reference current value;
wherein the locked rotor condition exists if the error value exceeds a predetermined threshold value.

5. A controller for controlling a blower motor, the controller comprising a computer readable storage medium having a lookup table encoded therein, the lookup table having a plurality of speed settings associated with the motor, each speed setting having an associated reference voltage and reference current value, the controller adaptable to:
   apply the reference voltage to the motor from a motor off condition, the reference voltage associated with a desired speed setting;
   measure current flowing through the motor to define a measured current value;
   compare the measured current value to the reference current value associated with the desired speed setting to determine if a locked rotor condition exists;
   if a locked rotor condition exists, increase the motor speed from the desired speed value until either the speed setting is maximized or the locked rotor condition ceases to exist and generating a diagnostic fault code having information associated with the locked rotor condition; and
   adjust the motor speed setting to the desired speed setting upon the motor start.

6. The controller of claim 5, wherein the measured current value and the reference current value are compared by the expression $$I_{error} = I_{measured} - I_{reference}$$

where:
$I_{error}$ is the error current value,
$I_{measured}$ is the measured current value, and
$I_{reference}$ is the reference current value.

7. The controller of claim 5, wherein the measured current value and the reference current value are compared by the expression $$I_{error} = I_{measured} / I_{reference}$$

where:
$I_{error}$ is the error current value,
$I_{measured}$ is the measured current value, and
$I_{reference}$ is the reference current value.

8. The controller of claim 5, wherein the lookup table further comprises one or more additional parameters associated with each speed value.

9. The controller of claim 5, wherein the controller is adaptable to store diagnostic codes to the storage medium.

10. The controller of claim 9, wherein the controller is adaptable to send the diagnostic codes to an engine control unit.

11. A system for protecting against a locked rotor condition in a blower motor, the system comprising:
   a blower motor adaptable to produce an output speed setting as a function of a voltage value;
   a controller adaptable to produce the voltage value, the controller having a computer readable storage medium, the storage medium including a lookup table encoded therein, the lookup table having a plurality of speed settings associated with the motor, each speed setting having an associated reference voltage value and reference current value defined in the lookup table, the controller adaptable to receive a desired speed setting, the storage medium including:

an instruction for applying the reference voltage to the motor from a motor off condition, the reference voltage associated with the desired speed setting;

an instruction for measuring current flowing through the motor to define a measured current value;

an instruction for comparing the measured current value to the reference current value associated with the desired speed setting to determine if a locked rotor condition exists;

an instruction for, if a locked rotor condition exists, increasing the motor output speed from the desired speed value until either the speed setting is maximized or the locked rotor condition ceases to exist and generating a diagnostic fault code having information associated with the locked rotor condition; and an instruction for adjusting the motor output speed to the desired speed setting upon the motor start.

12. The system of claim 11, wherein the instruction for comparing the measured current value to the reference current value is further defined by the expression $$I_{error} = I_{measured} - I_{reference}$$

where:
$I_{error}$ is the error current value,
$I_{measured}$ is the measured current value, and
$I_{reference}$ is the reference current value.

13. The system of claim 11, wherein the instruction for comparing the measured current value to the reference current value is further defined by the expression $$I_{error} = I_{measured} / I_{reference}$$

where:
$I_{error}$ is the error current value,
$I_{measured}$ is the measured current value, and
$I_{reference}$ is the reference current value.

14. The system of claim 11, wherein the controller lookup table further comprises one or more additional parameters associated with each speed value.

15. The system of claim 11, wherein the storage medium further includes an instruction for storing diagnostic codes to the storage medium.

16. The system of claim 15 further comprising an engine control unit in electrical communication with the controller, the storage medium further including an instruction for sending the diagnostic codes to the engine control unit.

17. The system of claim 15, wherein the controller instruction for storing diagnostic codes to the storage medium further includes logging the diagnostic code in a computer readable memory location.

* * * * *